(12) United States Patent
Kawaguchi

(10) Patent No.: US 6,371,800 B1
(45) Date of Patent: *Apr. 16, 2002

(54) ELECTRICAL CONNECTION BOX INCLUDING A WIRE GUIDE

(75) Inventor: Kiyofumi Kawaguchi, Yokkaichi (JP)

(73) Assignee: Sumitomo Wiring Systems, Ltd. (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/511,835

(22) Filed: Feb. 24, 2000

(30) Foreign Application Priority Data

Feb. 25, 1999 (JP) .......................... 11-048223

(51) Int. Cl.⁷ ............................................. H01R 13/60
(52) U.S. Cl. ....................................................... 439/535
(58) Field of Search ................................. 439/535, 536, 439/537, 445, 463, 464

(56) References Cited

U.S. PATENT DOCUMENTS

| | | | | |
|---|---|---|---|---|
| 3,622,942 A | * | 11/1971 | Rynk .......................... | 339/107 |
| 3,874,765 A | * | 4/1975 | Gilmore et al. ............. | 439/464 |
| 3,936,125 A | * | 2/1976 | Guy ........................... | 439/283 |
| 4,035,051 A | * | 7/1977 | Guy ........................... | 439/464 |
| 4,564,255 A | * | 1/1986 | Kirma ........................ | 339/103 |
| 5,690,507 A | * | 11/1997 | Grzybowski et al. ....... | 439/464 |
| 6,045,394 A | * | 4/2000 | Matsuoka et al. .......... | 439/464 |
| 6,056,587 A | * | 5/2000 | Matsuoka et al. .......... | 439/464 |

FOREIGN PATENT DOCUMENTS

| | | | |
|---|---|---|---|
| EP | 0865131 | 9/1998 | |
| EP | 0872936 | 10/1998 | |
| FR | 2485281 | * 12/1981 | ................. 439/464 |
| JP | 8256423 | 10/1996 | |
| JP | 10004619 | 1/1998 | |
| JP | 10080036 | 3/1998 | |

* cited by examiner

*Primary Examiner*—Tulsidas Patel
*Assistant Examiner*—Thanh-Tam Le
(74) *Attorney, Agent, or Firm*—Bierman, Muserlian and Lucas

(57) ABSTRACT

An electrical connection box having a wire guide projecting outwardly from its front and capable of receiving a wire harness. There is at least one opening through the wire guide or through a ring attached thereto which receives a tying band wrapped around the wire harness and the wire guide and extending through the opening. As a result, when the band is tightened, the wire harness is secured to the wire guide. The tying band is a strap with an enlarged head at one end with a hole therethrough. The other end passes around the wire harness and wire guide and through the opening. It then enters the hole and is retained by friction or a combination of a ratchet and a pawl.

5 Claims, 6 Drawing Sheets

ELECTRICAL CONNECTION BOX INCLUDING A WIRE GUIDE

The present Application claims the benefit of the priority of Japanese 11-048223, filed Feb. 25, 1999.

The present Invention is directed to an electrical connection box having a guide for a wire harness. More specifically, the guide directs the wire harness out of the box for further connection to various electrical elements used particularly in automotive electrical circuits. The device fixes the harness by the use of a tying band to prevent undesired movement.

BACKGROUND OF THE INVENTION

Conventional electrical connection boxes are located in automobiles in order to house the various electrical devices used in automotive circuits, such as relays and fuses. In addition, these boxes serve as branching points for wire harnesses.

FIGS. 7 and 8 show a typical prior art connection box having a wire guide projecting therefrom. Connection box 50 is comprised of cover 51 and housing 52. The desired electrical elements (not shown) are within the housing. Cut out 52B is provided in front 52A, which is one of the outer perimeter surfaces of housing 52. The cut out extends from the upper end to the lower end of front 52A. Wire guard 53 is in the shape of a half-cylinder extending diagonally downward from front 52A, with groove 54 facing up. This groove is continuous with cut out 52B. Flange 55, with its plane parallel to front 52A, is located at the end of wire guide 53 remote from front 52A. The angle of wire guide 53 to front 52A is determined by the nature and location of the electrical elements within housing 52, as well as the electrical elements outside the housing to which the wire harness is to be connected.

As best shown in FIG. 8, wire harness 57 extends from the unillustrated electrical elements in housing 52 through cut out 52B and is restricted by the semi-circular groove of guide 53. The wire harness is retained in guide 53 by tying band 56. The band is wrapped around guide 53 and its position is determined by flange 55. In other words, flange 55 defines the position at which wire harness 57 is located relative to wire guide 53, while also preventing tying band 56 from slipping off the end of the wire guide.

In order to fix wire harness 57 to wire guide 53, it is best that tying band 56 be tightened in the direction indicated by arrow b, i.e. perpendicular to wire guide 53. This is most reliable and prevents loosening. However, due to the usual space limitations within the engine compartment of an automobile (where the connection box is usually mounted), the force is actually applied in the direction of arrow a. This is required because of the presence of other elements crowded in the engine compartment.

As a result, gap 57A is formed between the wire harness and the tying band, and gap 53A is formed between the wire guide and the tying band. Thus, if vibration is present (as is usually the case), tying band 56 can slide down wire guide 53 to assume the position shown in broken lines. Thus, the band becomes loose on the guide and, in extreme cases, can even slip over flange 55. As a result, wire harness 57 is no longer secure and can move out of its desired position.

Since the various electrical elements to which wire harness 57 is connected are fixed, any movement by the harness causes problems of undue tension or too much slack, thus leaving the assembly open to electrical problems. Alternatively, the length of wire harness 57 will have to be adjusted or the harness moved back to its original position in order to provide reliable connections. It may even be necessary to reattach the tying band.

SUMMARY OF THE INVENTION

It is the object of the present Invention to provide an electrical connection box wherein the wire harness is reliably and firmly affixed to the wire guide. In a first embodiment, an electrical connection box is provided wherein the wire guide projects outwardly from the front of the box and is adapted to receive the wire harness. An opening is located in the wire guide and the tying band passes through the opening and around the wire harness and wire guide. Thus, when the band is tightened, the harness is secured and retained in its position regardless of the vibration to which it is subjected. In a preferred form of the Invention, there are two openings, one adjacent each of the edges of the wire guide and the tying band passes through both. This provides added security.

The tying band desirably comprises a strap having a head adjacent one end with a hole therethrough. The strap, after passing around the wire harness and wire guide and through the opening(s), is inserted into the hole and retained either by friction or a ratchet and pawl mechanism. It has been found useful, in this embodiment of the Invention, that the wire guide project from the lower end of the cut out. The wire harness passes through the cut out and rests on the upper side of the wire guide.

In a second embodiment of the present Invention, there is an insertion ring, mounted on the guide, having an opening parallel to the surface of the guide and perpendicular to the axis of the wire harness. The ring is either fixed to the wire guide or the wire guide constitutes one side of the ring. The tying band passes through the opening in the ring and secures the wire harness thereto. Since the ring is fixed to the guide, the band is secure in its position and cannot move.

When the wire guide is located at the upper end of the cut out, the wire harness is affixed to the underside thereof. Thus, by locating the wire guide at either the top or the bottom of the cut out, the wire harness can be located either against the bottom or top surface thereof. This provides desirable flexibility in the design and assembly of the connection box.

In a third embodiment of the Invention, the wire guide has an insertion opening adjacent one edge and a notch in the other edge opposite the insertion opening. The tying band passes around the wire harness, through the opening and is in the notch.

In a fourth embodiment of the present Invention, the wire guide is provided, at its remote end, with a flange substantially parallel to the front of the connection box. An insertion ring is provided alongside the flange and the band is passed therethrough. Preferably, there are two such insertion rings, one adjacent each edge of the wire guide. In such a case, the band passes through both. There can be additional insertion rings through which the tying band passes for still further safety and reliability. It has also been found desirable to form these insertion rings so that a portion of the wire guide constitutes one side of the ring.

For additional strength, a pair of side walls can be located adjacent the edges of the guide at the end near the connection box in any of the foregoing embodiments. The walls are affixed to both the front of the connection box and the wire guide. If desired, the wire guide can be arcuate in cross section so that it at least partially surrounds the wire harness. This will provide still further security.

BRIEF DESCRIPTION OF THE DRAWINGS

In the accompanying drawings, constituting a part hereof, and in which like reference characters indicate like parts.

DETAILED DESCRIPTION OF THE INVENTION

Figure 1:
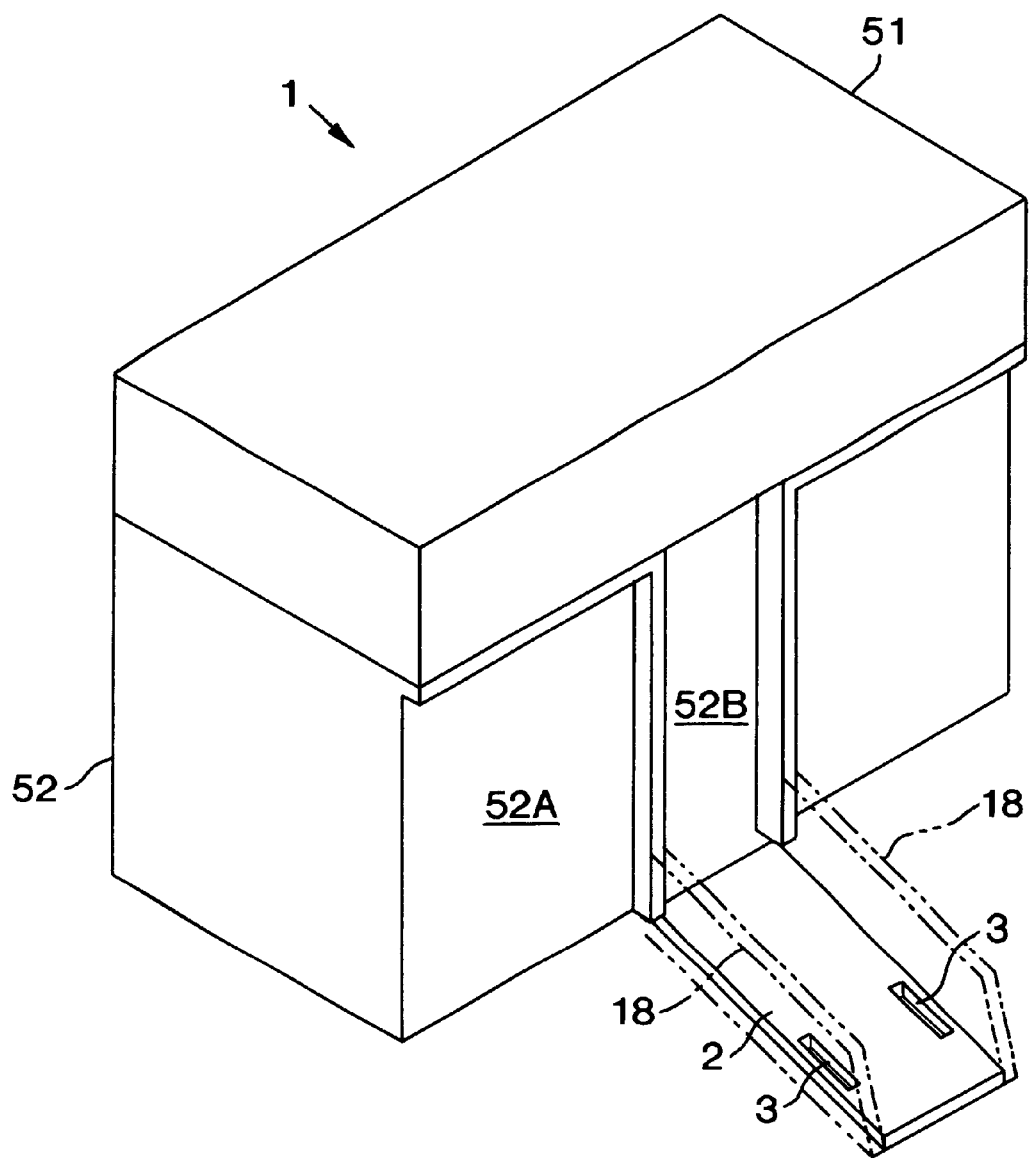
FIG. 1 is a perspective view of the first embodiment of the present Invention.
Figure 2:
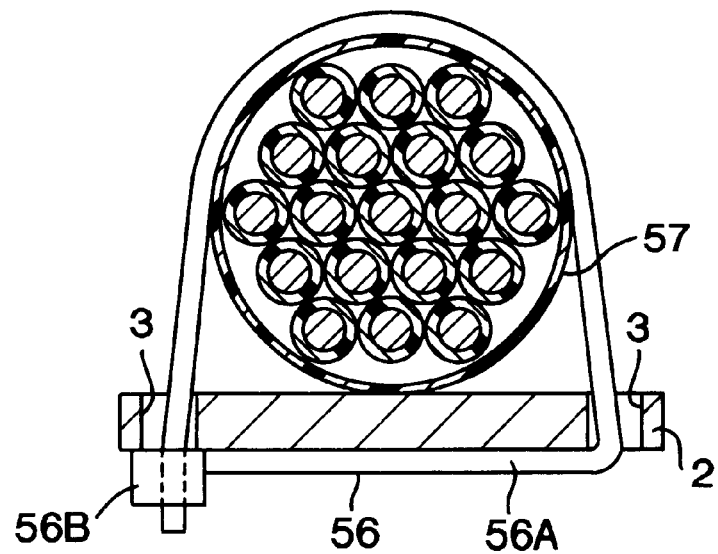
FIG. 2 is a partial cross section of the wire guide perpendicular to the axis of the wire harness.
Figure 3:
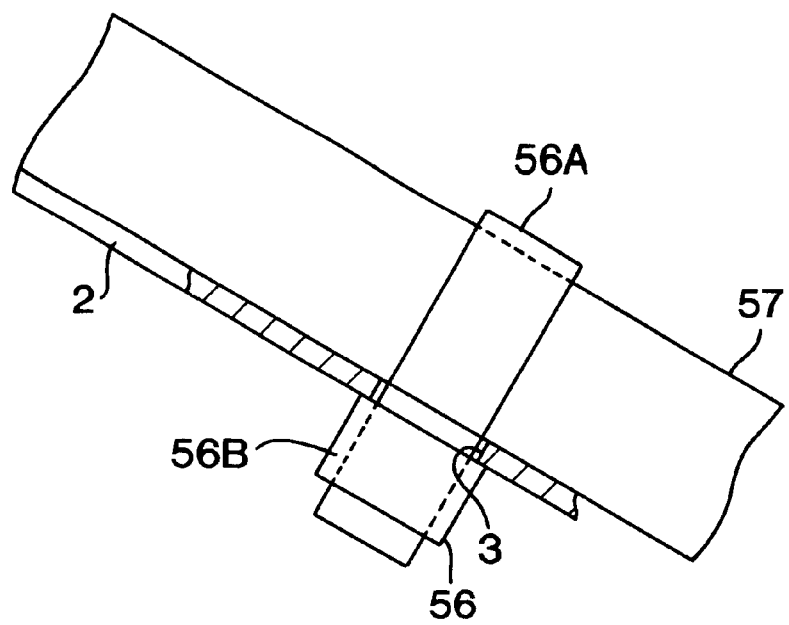
FIG. 3 is a partial cross section parallel to the axis of the wire harness.

Referring to FIGS. 1 to 3, connection box 1 comprises housing 52 and cover 51. Front 52A has cut out 52B from which wire guide 2 projects. Adjacent the edges of wire guide 2 are insertion openings 3. Wire harness 57 rests on wire guide 2 and is secured thereto by tying band 56. The tying band comprises strap 56A and head 56B. The band passes through insertion openings 3 and one end is within head 56B. It is retained therein, preferably either by friction or a ratchet and pawl combination.

In a modification of this embodiment, side walls 18 are provided on the edges of wire guide 2 in order to both provide additional strength and to assist in retaining the wire harness. These walls are shown in broken lines in FIG. 1.

Figure 4:
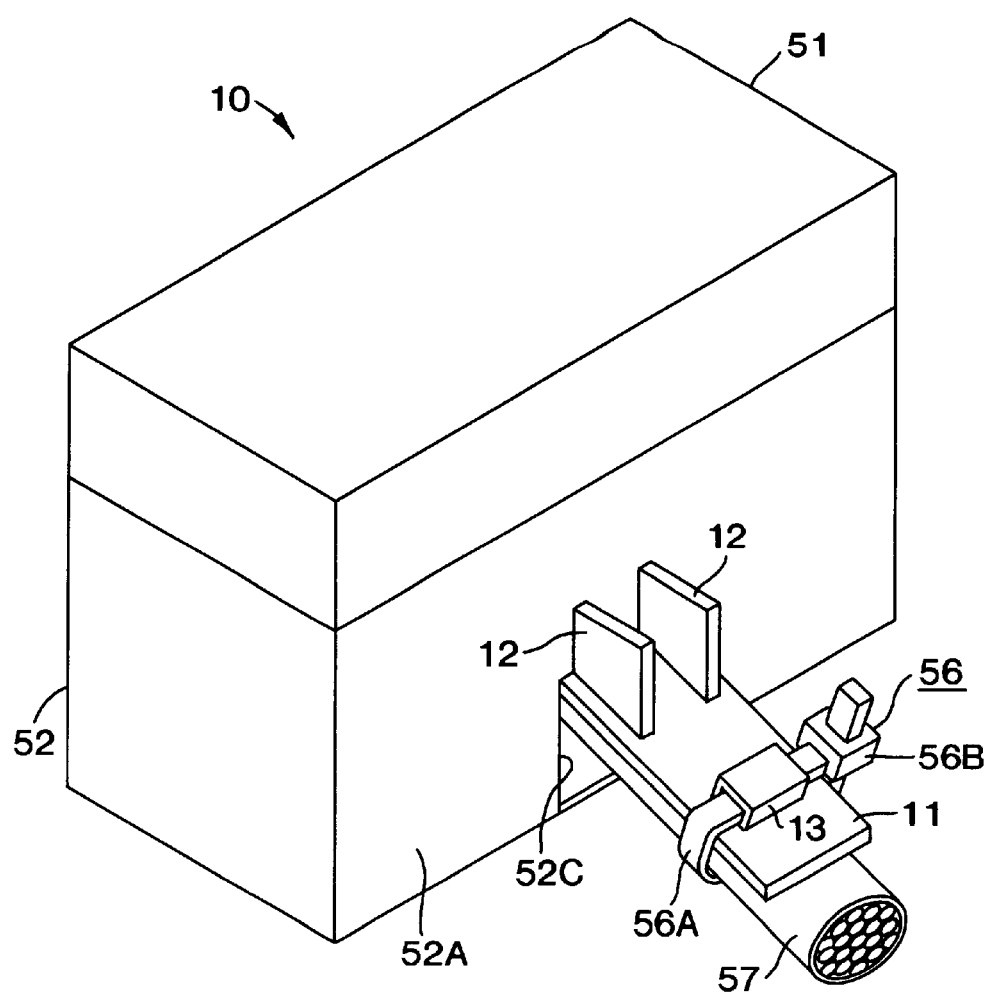
FIG. 4 is a view, similar to that of FIG. 1, of the second embodiment.

FIG. 4 illustrates the second embodiment of this Invention. Connection box 10 has cut out 52C and wire guide 11. The latter has mounted thereon, preferably as part thereof, insertion ring 13. This ring has an opening which passes through it in a direction parallel to front 52A of the connection box. Strap 56A of tying band 56 passes through insertion ring 13, around wire harness 57, and into the hole in head 56B. It is retained therein in the same manner as in the first embodiment., i.e. by friction or a ratchet and pawl or the like.

Figure 5:
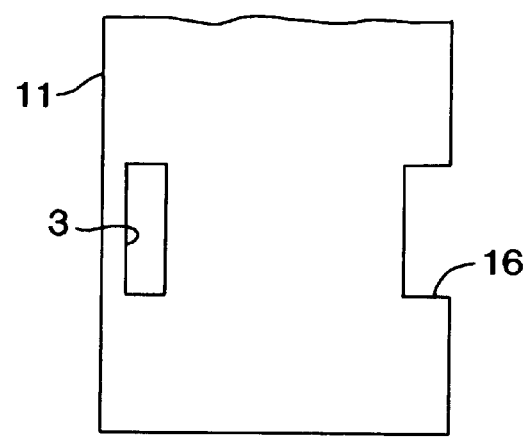
FIG. 5 is a fragmented plan view of the wire guide of the third embodiment.

In a third embodiment (see especially FIG. 5), insertion opening 3 is adjacent one edge of the wire guide. Opposite opening 3 is notch 16. In this form of the Invention, the tying band passes through insertion opening 3 and fits within notch 16. The strap is inserted into the hole in head 56B and retained therein as in the first and second embodiments.

Figure 6:
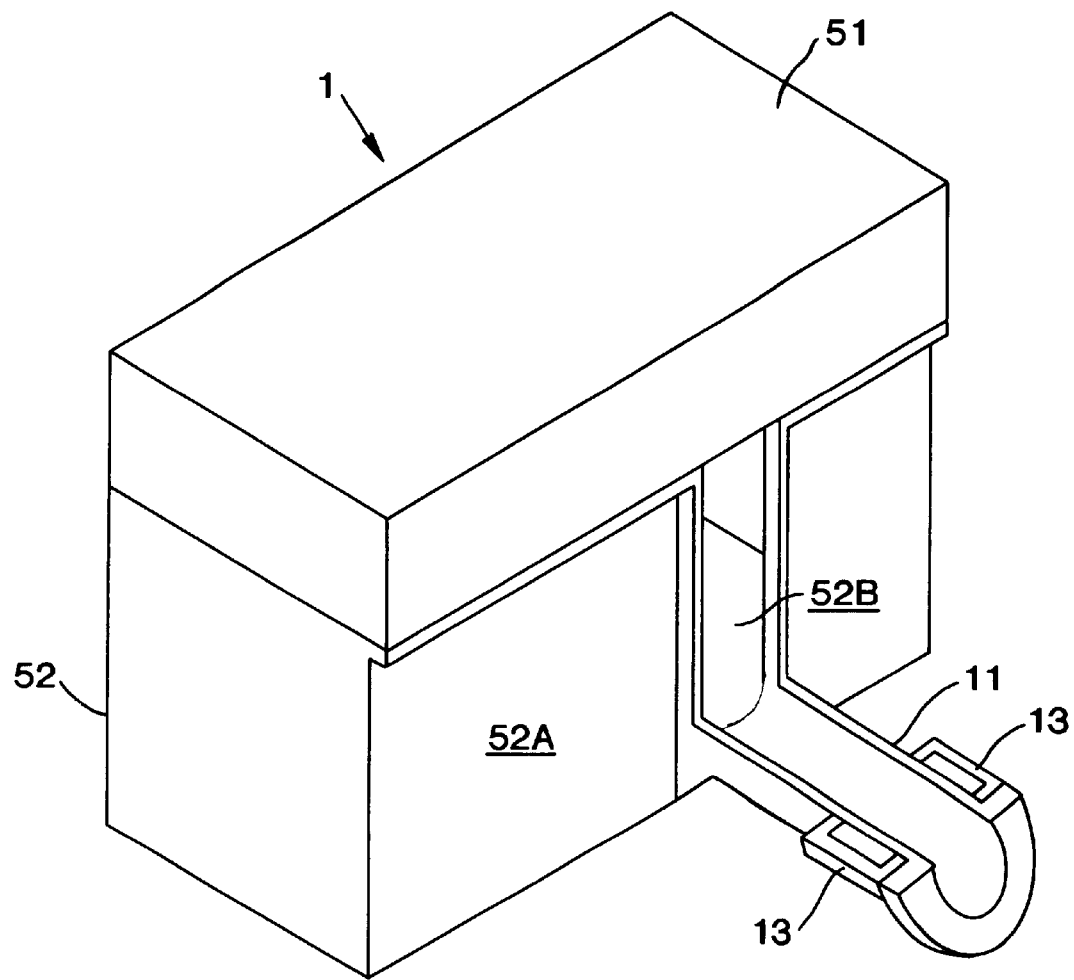
FIG. 6 is a view, similar to that of FIG. 1, of the fourth embodiment.
Figure 7:
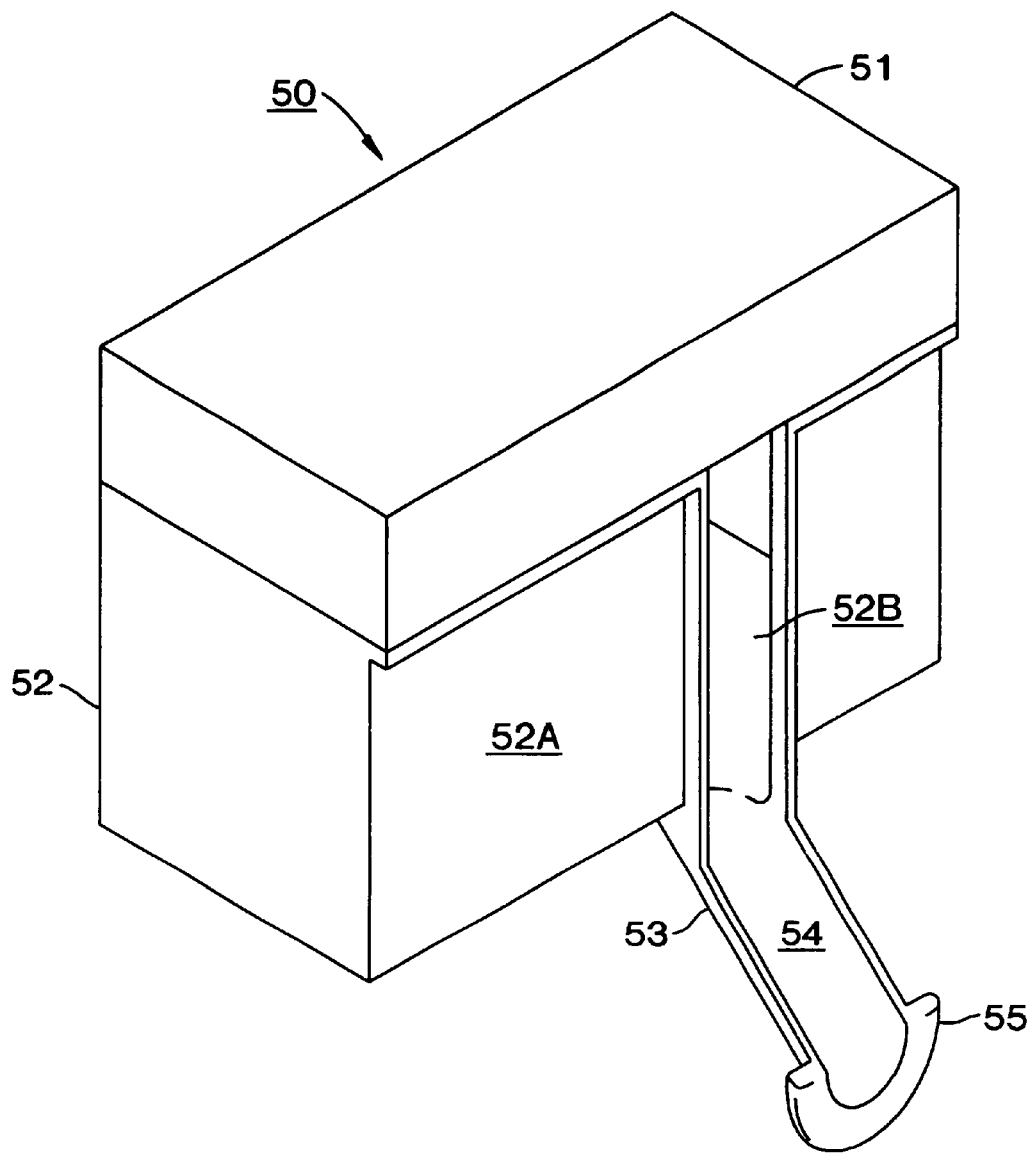
FIG. 7 is a view, similar to that of FIG. 1, of a prior art connection box.

FIG. 6 is a fourth embodiment of the Invention. Insertion rings 13 are on both edges of wire guide 11 adjacent flange 15. The band passes through both and bears against the flange. This provides still further security and reliability. Additional insertion rings can be provided if deemed desirable and, in such a case, the tying band would pass through all such rings.

Figure 8:
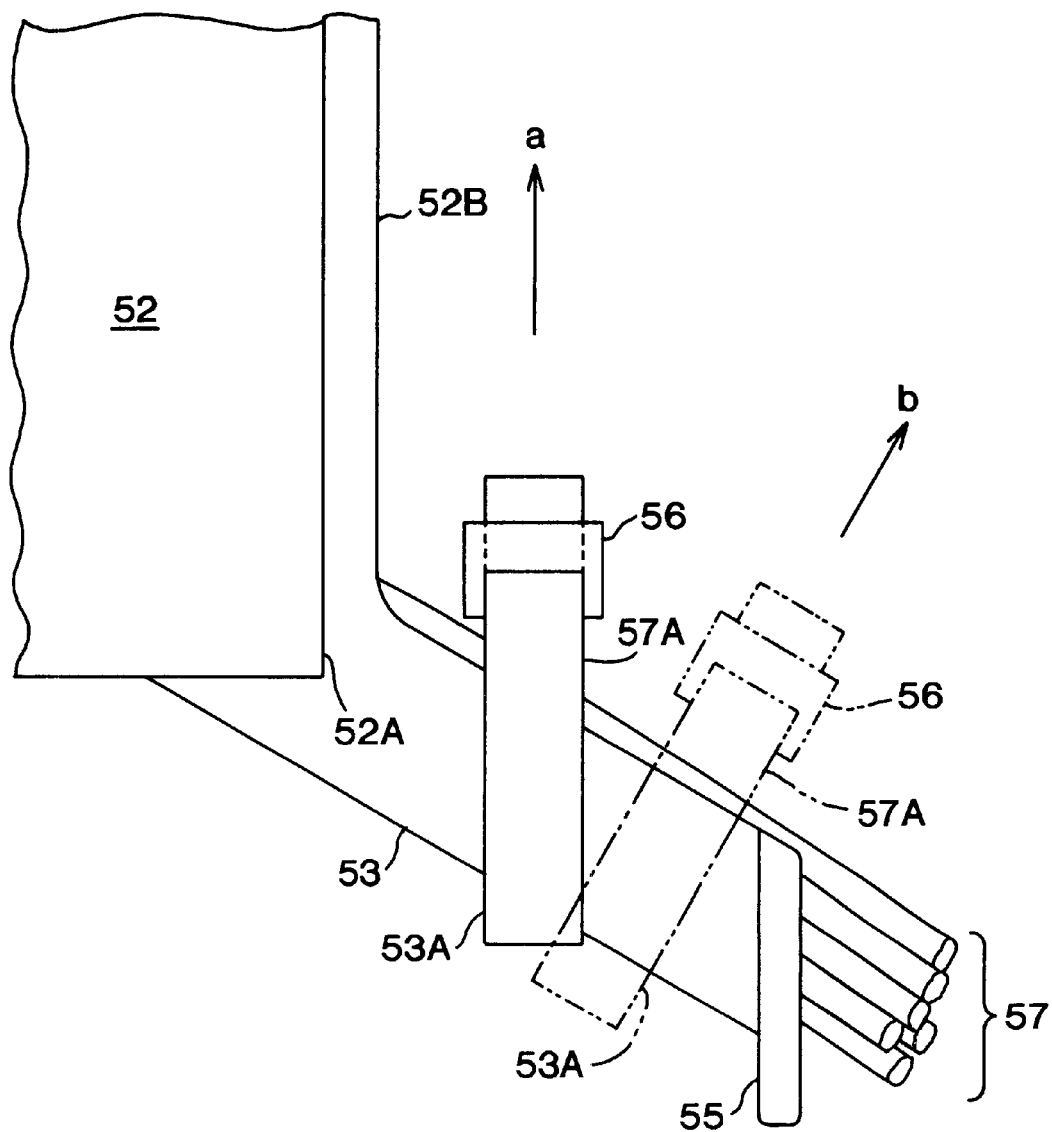
FIG. 8 is a view, similar to that of FIG. 3, of the prior art connection box of FIG. 7.

The various embodiments of the present Invention have substantial and important advantages over conventional connection boxes of this type. Because the tying band, in all cases, passes through at least one fixed opening in the wire guide, it will neither disengage from the guide nor slip off the end thereof. Furthermore, it will not shift its position as can happen with the device as shown in FIG. 8.

Since the insertion openings are perpendicular to the wire guide, no gaps are formed between the tying band and the wire harness nor between the tying band the wire guide. The band is tightened at the optimal position, there being no opportunity for looseness or other movement. The harness is accurately and permanently located and adjustment of the length of the wire harness becomes unnecessary.

Moreover, since the insertion openings are smaller than the head of the band, this permits the head to be abutted against the insertion opening without any risk of it passing through. This further aids in limiting any possible movement of the band relative to the guide and makes installation easier. Moreover, the structure is very simple and can easily and economically be produced.

The second embodiment of the present Invention provides an additional advantage in that the location of the insertion ring on the wire guide provides clear visibility thereof during wiring and tightening. Although the insertion ring can be a separate and complete element affixed to the wire guide, it is preferable that a section of the wire guide constitute a side of the ring. When this is done, the amount of resin material needed is reduced, thus having a favorable effect on production costs.

Although only a limited number of embodiments of the present Invention have been expressly disclosed, such modifications as would be apparent to the person of ordinary skill may be made without departing from the scope or spirit thereof. In the first embodiment, the positions of the insertion openings could be modified in accordance with the dictates of specific arrangements of electrical elements. The wire harness could be located on either the upper or lower surface of the wire guide, and the relationship between the cut out and the wire guide modified accordingly. Furthermore, the wire guides are not limited to a flat shape, but rather could be arcuate, semi-circular, or the like.

In the second embodiment, it is preferred that the insertion ring include a portion of the wire guide. This functions as one side thereof. However, it is also possible to have the wire guide complete in itself and otherwise affixed to the wire guide. A plurality of such rings could be used, with the tying band passing through all.

These and other modifications are contemplated within the present Invention which is to be broadly construed and not to be limited except by the character of the claims appended hereto.

What is claimed is:

1. An electrical connection box comprising a wire guide projecting outwardly from a front of said electrical connection box and adapted to receive a wire harness;

a cut out in said front, said wire guide projecting from a lower end of said cut out, said wire harness passing through said cut out and adjacent an upper side of said wire guide;

said wire guide consisting of an elongated, rectangular shaped planar surface having a long axis extending from an upper end where said wire guide is attached to said front of said electrical connection box to a lower end where said wire harness is secured to said wire guide, a pair of side walls affixed to adjacent edges of said wire guide, said side walls extending outwardly along said edges of said planar surface from said front of said electrical connection box to a leading end of said wire guide, two openings in said planar surface of said wire guide, said openings spaced apart in a first direction perpendicular to said long axis of said planar surface, one of said openings being adjacent each edge of said wire guide, a tying band, around said wire harness and extending through said openings whereby, when said typing band is tightened, said wire harness is secured to said wire guide.

2. The electrical connection box of claim 1 wherein said tying band comprises a strap with a head adjacent one end, said head having a hole therethrough, another end of said typing band passing through said hole and retained therein after said typing band is tightened.

3. The electrical connection box of claim 2 wherein said strap is retained in said head by friction or a ratchet and pawl.

4. The electrical connection box of claim 2 wherein said head is larger than said opening.

5. The electrical connection box of claim 1 wherein said tying band is adjacent an end of said wire guide, remote from said front.

* * * * *